United States Patent
Mizrah

(10) Patent No.: US 7,681,228 B2
(45) Date of Patent: Mar. 16, 2010

(54) METHOD OF ONE TIME AUTHENTICATION RESPONSE TO A SESSION-SPECIFIC CHALLENGE INDICATING A RANDOM SUBSET OF PASSWORD OR PIN CHARACTER POSITIONS

(75) Inventor: Len L. Mizrah, San Carlos, CA (US)

(73) Assignee: Authernative, Inc., Redwood Shores, CA (US)

( * ) Notice: Subject to any disclaimer, the term of this patent is extended or adjusted under 35 U.S.C. 154(b) by 592 days.

(21) Appl. No.: 11/353,560

(22) Filed: Feb. 14, 2006

(65) Prior Publication Data

US 2006/0136317 A1 Jun. 22, 2006

Related U.S. Application Data

(63) Continuation of application No. 09/706,370, filed on Nov. 3, 2000.

(51) Int. Cl.
| | |
|---|---|
| G06F 7/04 | (2006.01) |
| G06F 17/30 | (2006.01) |
| H04L 9/32 | (2006.01) |
| H04K 1/00 | (2006.01) |
| G06K 5/00 | (2006.01) |
| H04L 29/06 | (2006.01) |
| G06Q 40/00 | (2006.01) |

(52) U.S. Cl. ............... 726/2; 726/18; 726/26; 380/250; 235/382; 713/155; 713/158; 713/159; 705/35; 705/39

(58) Field of Classification Search ............. 705/1, 705/13, 35, 38, 39, 44; 380/4, 9, 24, 25, 380/247–250; 726/1, 2, 5, 18, 19, 27; 711/147, 711/149–151, 153, 155; 713/155–159, 185; 379/145; 902/1, 2, 7; 235/279, 380, 382

See application file for complete search history.

(56) References Cited

U.S. PATENT DOCUMENTS 4,219,151 A * 8/1980 Haruki ............... 235/379

(Continued)

FOREIGN PATENT DOCUMENTS

| GB | 2352861 | 2/2001 |
|---|---|---|
| JP | 6083777 | 3/1994 |
| JP | 9097238 | 4/1997 |

(Continued)

OTHER PUBLICATIONS

"Authernative(R) Cryptographic Module Achieves Stringent FIPS 140-2 Government Standard"; PR Newswire; May 22, 2008; pp. 1-10.*

(Continued)

*Primary Examiner*—Ella Colbert
(74) *Attorney, Agent, or Firm*—Haynes Beffel & Wolfeld LLP

(57) ABSTRACT

Financial institution back office computerized transaction-processing system with embedded privacy and security layer (EPSL) enables strong transaction authentication prior to a merchant or vendor contact, based on a user account number, transaction conditions like anticipated transaction time and money, user two-factor authentication with a static transaction PIN and a transaction session-specific random partial password or PIN recognition algorithm. User enters the user name and then, challenged by server with a random session-specific subset of a password or PIN character's consecutive position numbers, enters based on cognitive association a one time authentication response. The authentication session is interactive, transaction session-specific, and followed by either a transaction denial or an alphanumeric transaction signature generated by EPSL for this specific transaction. Then, the user submits her request to a transaction counterpart along with the transaction signature. The merchant or vendor requests an authorization session with EPSL.

8 Claims, 12 Drawing Sheets

U.S. PATENT DOCUMENTS

| | | | |
|---|---|---|---|
| 5,276,314 A * | 1/1994 | Martino et al. | 340/5.27 |
| 5,655,020 A * | 8/1997 | Powers | 713/185 |
| 5,883,810 A * | 3/1999 | Franklin et al. | 700/232 |
| 5,991,750 A | 11/1999 | Watson | |
| 6,047,270 A | 4/2000 | Joao et al. | |
| 6,085,320 A | 7/2000 | Kaliski, Jr. | |
| 6,098,053 A | 8/2000 | Slater | |
| 6,141,751 A | 10/2000 | Ogawa | |
| 6,178,409 B1 | 1/2001 | Weber et al. | |
| 6,189,098 B1 | 2/2001 | Kaliski, Jr. | |
| 6,253,328 B1 * | 6/2001 | Smith, Jr. | 726/18 |
| 2002/0099649 A1 * | 7/2002 | Lee et al. | 705/38 |

FOREIGN PATENT DOCUMENTS

| | | | |
|---|---|---|---|
| JP | 10293799 | | 11/1998 |
| JP | 2002007342 | | 1/2002 |
| WO | WO-9613013 | | 5/1996 |
| WO | WO 99/49424 | * | 9/1999 |
| WO | WO 00/42486 | | 7/2000 |

OTHER PUBLICATIONS

"Solving password proliferation"; Anonymous; Government Executive, v30n9; Sep. 1998; pp. 1-5.*

"P@$$word Management Security Solutions"; Security Computer Security; Aug. 2000; pp. 73-75.*

Harold Joseph Highland; "With tokens, it's a new password every time"; Computerworld; Jun. 11, 1990; pp. 88-89.*

Translation of Japanese Search Report issued Apr. 28, 2008 for JP 2003-436823 to Authernative, Inc., 6 pages.

* cited by examiner

| EPSL PROTOCOL ITEMS DELIVERED TO FI BACK OFFICE (CPU & dB) | AUTHEN-TICATION SESSION | AUTHO-RIZATION SESSION | ACCOUN-TING SESSION |
|---|---|---|---|
| ACC#{XYZ} | + | + | - |
| (W / D)_PIN | + | - | - |
| ID_PIN SUBSET | + | - | - |
| (W / D)$ | + | - | - |
| (W/D)#_GEN(ACC#{XYZ}, TX1) | + | + | + |
| T_INT(ACC#{XYZ}, TX1) | + | - | - |
| ACC#{XYZ}_TX1 | + | + | + |
| ACC#{XYZ}_TX2 | - | + | + |
| BUS# | - | + | + |
| T-AMOUNT | - | + | + |

FIG. 8

METHOD OF ONE TIME AUTHENTICATION RESPONSE TO A SESSION-SPECIFIC CHALLENGE INDICATING A RANDOM SUBSET OF PASSWORD OR PIN CHARACTER POSITIONS

CROSS REFERENCE TO RELATED CASE

The present application is a continuation of U.S. patent application Ser. No. 09/706,370, filed 3 Nov. 2000, now pending, and which is incorporated by reference as if fully set forth herein.

BACKGROUND OF THE INVENTION

1. Field of the Invention

The present invention relates to a system and method for private and secure transactions and more particularly to a system and method for providing private and secure buy/sell or withdraw/deposit transaction environment within financial institutions and at merchants/sellers/vendors transaction-processing systems.

2. Description of the Related Art

Basic financial transactions including buy/sell and withdraw/deposit, have always required security to protect the financial account holder, the financial institution where the account resides, and a merchant/seller/vendor or other party at the point of sale from identity theft and fraudulent transactions. Due to wide spread use of computer networks and electronic commerce as a new medium to perform transactions, new requirements to maintain validity and integrity of financial transactions are arising. There are companies gathering, sorting, researching and selling for profit consumers' private personal information acquired during financial transactions. It would be advantageous to provide an efficient system and method to protect customers' privacy during financial transactions. Another new requirement is associated with the fact that hackers and intruders getting an illegal access to the computer network can compromise financial transactions. This aspect of transactions' security is addressed in U.S. Pat. No. 6,092,202 to Veil et al.

Throughout the entire history of financial transactions, privacy and security were addressed by the best contemporary technologies. Since the onset of the computer network era, computer power, relational databases, software environments and communication lines have been used by financial institutions for security and privacy functions. Banks, then credit card companies and eventually brokerage companies and other financial institutions have used them to perform authentication, authorization and accounting, referred to as AAA, at their back offices during financial transactions.

Financial transactions with credit cards suffer significant losses due to weaknesses in implementing the authentication stage of financial transaction. A party at the point of sale compares human signatures visually on a card (if there is any) and on a selling slip. This operation is error prone when identifying faked signatures in a case of fraudulent actions. If a financial account holder loses an unsigned credit card it is easy to fake signatures as one can place any signature on a card before requesting a financial transaction. Another typical malfunction at the authentication stage of financial transaction occurs when someone gets a credit card account number and a copy of the card owner's signature. This enables fraud even with non-stolen credit cards. Another example where financial institutions incur losses is caused by financial account holders, when they change their minds after concluding a financial transaction. A financial account holder can repudiate the financial transaction by claiming that somebody transacted in their place.

These examples show that there is a real and substantial need for an improved financial transaction architecture at the authentication stage of financial transaction. The fact that mistakes in authenticating non-real credit card owners followed by successful authorization and accounting sessions at financial institution back offices illustrate another weakness of the financial transaction architecture. Authorization and accounting stages are de-coupled from the actual financial account holder, while the authentication stages are de-coupled from financial institution back office computers.

Though credit cards have been used as a financial transaction instruments since the beginning of electronic commerce, there is number of issues in architecture that have become apparent. For instance, credit card data, a social security number, a card holder name, phone, address etc., while transferred through the Internet, are not absolutely secure and can fall into "wrong hands" due to communication channel leaks. It is obvious that while high speed data flow through the Internet or other communication channels is a big advantage for financial transactions, insufficient data security makes it highly desirable to alter the financial transaction architecture to avoid potential data leaks on communication lines (Internet and non-Internet as well).

Another issue jeopardizing financial transactions in electronic commerce is weakness of the authorization stage of financial transactions with credit cards. Neither the authorization stage nor the accounting stage are actively controlled and timed by financial account holders. Numbers of non-requested sell transactions may happen before a financial account holder regains control on his/her account. U.S. Pat. No. 5,485,510 to Colbert and U.S. Pat. No. 6,052,675 to Checchio disclosed attempts to improve the authorization stage of financial transactions in order to enhance financial transaction security. The Colbert patent proposed to alter financial transactions by authorizing a financial account holder before he/she applies to a merchant (a vendor). Information supplied to financial institution back office includes a credit card account number, a secret PIN and merchant/financial transaction specific information (at least, merchant ID number and financial transaction amount). Then the merchant is given only the authorization code, while the card number and the PIN remain unknown to the merchant or anybody, if the card is lost or stolen. Similar architecture is offered in the Checchio patent, except a merchant does not get any authorization code, but rather a credit card account number. Since the financial transaction is pre-authorized in this case, a merchant sends into the financial institution back office a credit card account number and merchant/financial transaction specific information, which is compared with data given by the financial account holder during the pre-authorization stage. Neither a merchant nor anybody can use the card without knowing a secret PIN, if it is lost or stolen.

Though both patents allow improve security against fraudulent usage of credit cards for certain types of transactions, there are limitations to be addressed. Both patents are centered on phone lines, when communicating to financial institution back offices. Frequent usage of a pair of static numbers over phone lines is insecure due to leaks at the line entries and on the lines themselves. This issue gets aggravated, if one would like to replace phone lines by wireless or the Internet communication lines. Another weakness common to both patents is lack of a system and/or method as to how the financial institution back office is supposed to handle proposed architectural changes for mass financial transactions. Financial transaction architectures ought to cover financial account holders, financial institutions and a party at the point of sale in a mutually dependent way. A necessity to have prior to the authorization stage knowledge of a party at the point of sale and other financial transaction specifics is an additional limitation in both proposed innovations. That narrows down types of possible financial transactions and locations, in which they can be performed from.

There is a public concern that financial transactions with credit cards either in electronic commerce channels or in other traditional channels could lead to private personal consumers' information being accessed, monitored, tracked, stolen and fraudulently used or sold for profit often without the consumers' approval. Privacy related problems are exacerbated with the advanced Internet related technologies due to the ease with which information can be collected, processed and combined with other information.

It is not only financial transactions with credit cards which raise numerous privacy issues. Even during standard withdraw/deposit financial transactions at a bank, a financial account holder would not always like a bank teller to have access to his/her private personal information file. It would be beneficial if a financial account holder could decide whether this privilege should be given to the bank teller. More often than not, withdraw/deposit financial transactions at a bank require financial account holder identification documents to be revealed, which can be viewed as a certain privacy related inconvenience justified by the current state of the authentication architecture during financial transaction.

FIG. 1A illustrates a block diagram of a conventional system for performing withdraw/deposit transactions. In order to perform financial transactions, a legal adult 101 (or a legal business) is supposed to have an account with a financial institution. It is standard to disclose a private, personal information profile 102 to the financial institution during the account application process. At step 104, the financial institution, which permitted an account opening, creates a personal log file in the financial institution back office establishes a withdraw/deposit mechanism, and issues personal checks and cards. Then financial account holder, whether it is a legal person 101 or a legal business, can perform deposit 105 or withdraw 106 transactions. Typical deposit transactions to a bank or a brokerage house 107 are made through either a direct/mailed deposit with a personalized deposit slip 109 or by submitting a check on one's name and disclosing one's account number. Another way of obtaining deposits is used by insurance 117 and credit card companies 115, which receive paid statements 119 from financial account holder. Checks 110, debit cards 112 or Graphical User Interfaces (GUI) over the Internet 113 are used by financial account holders for withdraw transactions with a bank or a brokerage house 108. The credit card 116 is a typical withdraw mechanism for withdraw transactions with credit card companies (whether they are banks like Visa and Master Card or not, like American Express). Another withdraw mechanism is used by financial account holders when dealing with insurance companies 118. A request for payment 120 is to be made in accordance with the insurance policy.

There are deficiencies in the deposit/withdraw transaction system described above related to privacy and security of the financial account holder and financial institution performing transactions including the following:

1) Direct and urgent deposit transactions can be hindered, if the financial account holder is located far away from the bank and its branches where the account resides. It should be possible to deposit to one's account via other financial institutions, without disclosing private personal information of financial account holders at other financial institution's intermediate service levels.

2) During depositing, bank tellers get access to the private personal information of the financial account holder. There are two issues here. Firstly, a teller can make mistakes altering personal and account balance information without any immediate financial institution back office CPU and dB control. In other words, each deposit transaction has a probability of mistakes, hurting the bank and the financial account holder. Secondly, the financial account holder may not like a bank teller to have access to his/her private personal information file during direct depositing. At this stage it would be beneficial, if financial account holder could decide him-/her-self whether this privilege should be given to the bank teller.

3) Insufficient theft and fraud protection during withdraw transactions with checks, credit, charge and debit cards or during electronic commerce financial transactions.

4) Private personal information is not protected and often intentionally or unintentionally misused by a party at the point of sale or bank tellers during withdraw transactions.

FIG. 1B illustrates a block diagram of a conventional system for performing buy/sell transactions. Once financial account holder 121, has made a buying decision 122 and applied to a party at the point of sale, the actual selling transaction is enabled through cash 124, credit cards 116, debit cards 112, checks 110 or electronic commerce 125. Though cash is handy for low value financial transactions, it is usually impractical for the bulk of mass financial transactions due to low cash amount on hand. All other financial transaction instruments except cash, such as credit cards 116, debit cards 112, electronic commerce 125 and checks 110 lead to either complete or partial disclosure of private personal information 127, and are therefore prone to private personal information misuse and fraudulent actions 128.

FIG. 2 illustrates a block diagram of a conventional system and method for performing authentication, authorization and accounting sessions during buy/sell transactions with a credit card, a charge card or a debit card. As illustrated in FIG. 1B and FIG. 2, once a financial account holder 121 has made a buying decision 122 and applied to a party at the point of sale, a point-of-sale (POS) device scans static information on a credit card and sends an authorization request to financial institution back office, specifying price (money transaction amount), to perform a withdraw transaction 205. The financial institution back office CPU checks whether there is enough money in the database under this account and if yes, and if the card is not marked in the database as lost, stolen or fraudulently used, authorizes the withdraw transaction 206 (it sends an authorization code to POS device). Steps 205 and 206 constitute the authorization stage 201 of the financial transaction. It is worthwhile to note that in the conventional financial transaction system with credit/debit cards, the authorization stage is performed prior to authentication and accounting stages of the financial transaction.

Once the transaction authorization is sent to a party at the point of sale 206, the first accounting step 202 is performed. The account under transaction is left with a locked sum of money to assure a payment to a party at the point of sale 207. The payment is made after deduction of the transaction fee to the card issuing bank and the discount rate fee to the acquiring bank or an independent sales organization, which provided the merchant status to a party at the point of sale. Once step 207 is completed, the financial institution back office is ready for another transaction of the same financial account holder, provided the requested spending limit is not exceeded.

Then if the credit card is signed, the signatures on the selling draft and on the card are visually compared at a party at the point of sale for off line financial transactions 208. If the card is not signed, identification documents are requested from financial account holder 209. Steps 208 and 209 are components of the authentication stage of financial transaction 203 for the conventional off line financial transaction system. It can be noted here that the conventional electronic commerce on line financial transaction system based on credit/debit card usage skips step 208, and instead enforces step 209, requiring quite wider disclosure, than in a case of off line financial transaction, of financial account holder private personal information. Then the final step of accounting stage 204 is performed. Step 210 includes the following: a party at the point of sale sends the selling draft inside the selling batch after trade hours to the acquiring bank (or an independent sales organization). The acquiring bank re-routes the respective part of the batch to the card issuing bank to unlock the payment and transfer it to a merchant account after deductions, specified in the merchant's agreement. Then the money is placed into a merchant account in few days.

The conventional financial transaction architecture based on credit/debit cards and shown in FIG. 2 has the following weaknesses, which the present invention addresses:

1) Authentication stage is de-coupled from financial institution back office CPU and dB, making it subjective, embarrassing, error and fraud prone.

2) Authorization stage is de-coupled from financial account holder for both on and off line financial transactions, making it especially dangerous for on line financial transactions (due to on line financial transaction latency, a number of unauthorized financial transactions may happen before financial account holder regains control on the account).

3) Private personal information leaks are possible on the Internet communication lines during electronic commerce sessions (browsing technology, TCP/IP protocols, PKI, SSL and other Internet technologies do not guarantee sufficient financial transaction security).

4) Accounting stage is de-coupled from financial account holder, keeping one at inconvenience during a series of buy/sell financial transactions.

5) A party at the point of sale may collect and analyze financial account holder private personal information, and market and sell it for profit. This leaves public at large unaware of privacy and confidentiality status of the data.

Present on line and off line financial transaction architectures have substantial security and privacy deficiencies at the authentication, authorization and accounting stages. It would be highly desirable to provide an improved system and method wherein consumers can perform financial transactions with financial institutions without privacy and security concerns. The present invention addresses these problems.

SUMMARY OF THE INVENTION

It is therefore an object of the present invention to cut off merchants/sellers/vendors from consumers' private personal information during financial transactions.

A further object of the present invention is to allow a financial account holder to cut off bank tellers from their private personal files during withdraw/deposit transactions.

A further object of the present invention is to provide a method, which couples together a financial account holder and a financial institution back office during the authentication stage of financial transaction to insure highly elevated and enhanced security of financial transactions.

A further object of the present invention is to create the authentication stage architecture of financial transactions, which makes the authentication stage of financial transactions a transaction specific one; e.g. it can be used just only for one particular financial transaction.

A further object of the present invention is to include the beginning of the accounting session of a financial transaction into the authentication stage architecture of financial transaction to enhance transaction specific authentication architecture.

A further object of the present invention is to architect a financial transaction authentication session in a way that makes a positive authentication outcome a time specific one for a particular financial transaction.

A further object of the present invention is to design a system and to provide a method for financial transactions that enables merchants/sellers/vendors to request financial institution back offices to authorize and to account financial transaction just for one particular financial transaction requested by financial account holder.

A further object of the present invention is to include the end of the accounting session into the authorization stage architecture of financial transaction.

A further object of the present invention is to create financial transaction architecture that provide a high security level even in an environment with possible leaks on communication lines due to incomplete security of such Internet technologies as SSL (Secure Socket Layer), TCP/IP protocol, WEB browsers etc.

A further object of the present invention is to provide "clocked" AAA for financial institution back offices that allows implementation of financial transaction specific AAA architectures.

The present invention is a system and method for providing private and secure financial transactions. The system and method comprise a "clocked" AAA method embedded into financial institution back office privacy layer architectures. The architecture comprises "back office connection devices" for use by financial account holders to connect to financial institution back offices. Such devices include for example regular phones, and personal computers with a specific Graphical User Interface (GUI) invoked through a Universal Resource Locator (URL) address. Alternatives include network computers or wireless personal organizers, interactive TV set sessions or smart cards with customized read/write devices to interact with financial institution back offices. The architecture-comprises also a financial institution back office central processing unit ("the CPU"), which could include a farm (or cluster) of compute and file servers operated under either UNIX Sun/Solaris or Windows NT operating system; a number of software programs (software modules) designed to implement various functions of "clocked" AAA; a relational database (dB) inside financial institution back offices, where the actual account information is stored and accessed. The financial institution back office includes a dB connected to the CPU where information is processed using the "clocked" AAA program environment.

The present invention allows consumers having membership with any financial institution to perform financial transactions in a highly secure and private manner. Financial account holder private personal information need not be disclosed to a party at the point of sale nor a bank teller. Finally, the system and method are well adapted to the current and upcoming software, hardware and electronic commerce technologies and can be easily implemented given an acceptable business trade off.

A method for managing financial transactions according to the present invention includes performing an authentication process, an authorization process and an accounting process. The authentication process is executed for a predicted transaction by a particular account holder.

One representative embodiment of the authentication process includes establishing a communication session between the particular account holder and the financial transaction server, accepting an account number as input, prompting the particular account holder to supply a static identification number at a first instance, and a dynamically identified combination of digits from a personal identification code, wherein the combination does not include all the personal identification code, at a second instance.

The predicted transaction has a predicted transaction amount and a predicted transaction time. The authentication process produces a transaction signature for presentation upon execution of the predicted transaction. The information identifying the predicted transaction, and the time stamp are stored in an authentication record. The authorization process for a particular transaction has an actual transaction amount and an actual transaction time which are determined upon presentation of the transaction signature. The authorization process includes verifying that the presented transaction signature matches the transaction signature for the predicted transaction, that the actual transaction amount matches the predicted transaction amount, and that the actual transaction time matches the predicted transaction time. The accounting process for the particular transaction is performed as a result of a successful authorization process. The accounting process includes reconciling the predicted transaction amount and actual transaction amount for the particular account holder.

According to one embodiment of the invention, the predicted transaction amount and the transaction signature for a predicted transaction are stored in an authentication record in a database at the financial institution back office. Likewise, an authorization record is created during the authorization process. The authorization record and the authentication record are compared to complete the authorization process for the transaction. Thus, the authentication record includes the predicted transaction amount and the transaction signature. Also, a predicted transaction time is stored in the database which holds the authentication record, as for example, a time out interval length used in combination with a time of creation of the authentication record, or for another example, as an absolute time value.

A representative embodiment of the authorization process includes establishing a communication session between a party to the particular transaction and a financial transaction server. At the server, a presented transaction signature is accepted and an actual transaction amount is received as inputs. The server compares the time of the particular transaction with the predicted time, and the presented transaction signature and the actual transaction amount with the predicted transaction amount and the transaction signature associated with the transaction. An authorization message is sent to the party to the transaction upon successful matching of the parameters.

The process for managing financial transactions according to present invention works with or without identification of the financial account holder during the authorization process.

In various embodiments, the present invention comprises a system which executes the authentication process, the authorization process, and the accounting process utilizing communication media interconnecting the financial institution back office with individual end stations, such as cell phones, point-of-sale devices, personal computers, handheld computers, and the like. In an alternative embodiment, the present invention comprises an article of manufacture storing computer programs used for executing the processes as outlined above.

In yet other embodiment, the present invention provides a financial transaction server including communication resources, processing resources, and data storage resources utilized for managing the processes described above.

The present invention also provides a method for automated authentication, authorization and accounting for financial transactions. The method comprises establishing an authentication record for a predicted transaction by a particular account holder. The authentication record includes information identifying a predicted transaction having a predicted transaction amount and a transaction time parameter. Also, an authenticated transaction signature for presentation upon execution of the predicted transaction is included in the authentication record. The method also comprises establishing authorization record for a particular transaction indicating an actual transaction amount, an actual transaction time and a presented transaction signature. The authorization record and the authentication record are matched to determine whether the presented transaction signature matches the authenticated transaction signature for the predicted transaction, whether the actual transaction amount matches the predicted transaction amount, and whether the actual transaction time matches the transaction time parameter. Finally, the predicted transaction amount and actual transaction amount are reconciled for the particular account holder. According to various embodiments, the method includes storing the authentication record in a database including a plurality of authentication records for predicted transactions. The process involves periodically attempting to match authentication records with authorization records being created with a timed algorithm, which automatically times out authentication records based on their time of creation and a parameter determining a length of time within which the predicted transaction must be completed.

In sum, a secure and private financial transaction process is provided that can be deployed efficiently and which addresses many of the, deficiencies of other existing systems.

Other aspects and advantages of the present invention can be seen on review of the drawings, the detailed description and the claims which follow.

BRIEF DESCRIPTION OF THE DRAWINGS

FIG. 8 is the EPSL transaction checklist.

DESCRIPTION OF PREFERRED EMBODIMENTS

Figure 1A:
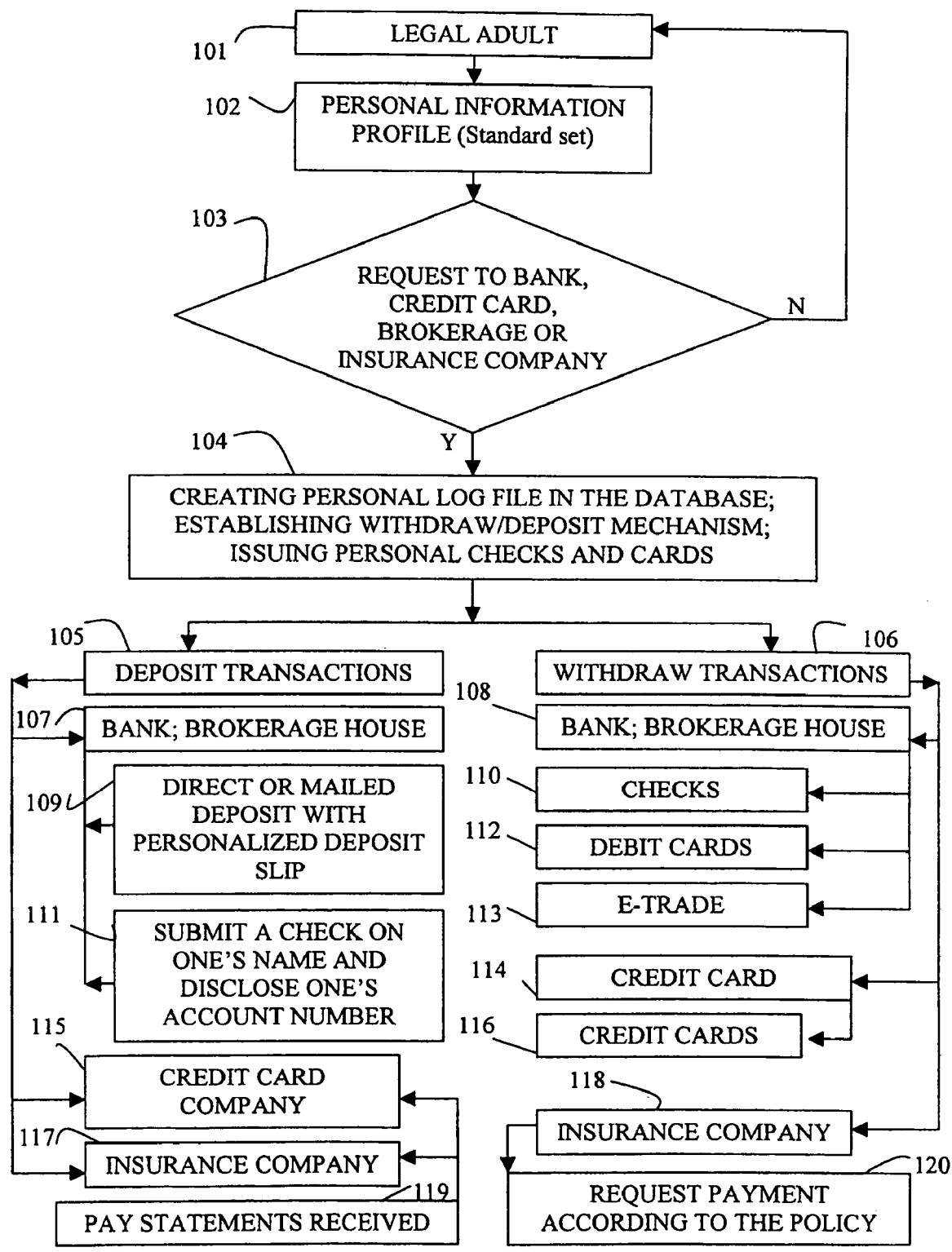
FIG. 1A is a block diagram of a conventional system for performing withdraw/deposit transactions.
Figure 1B:
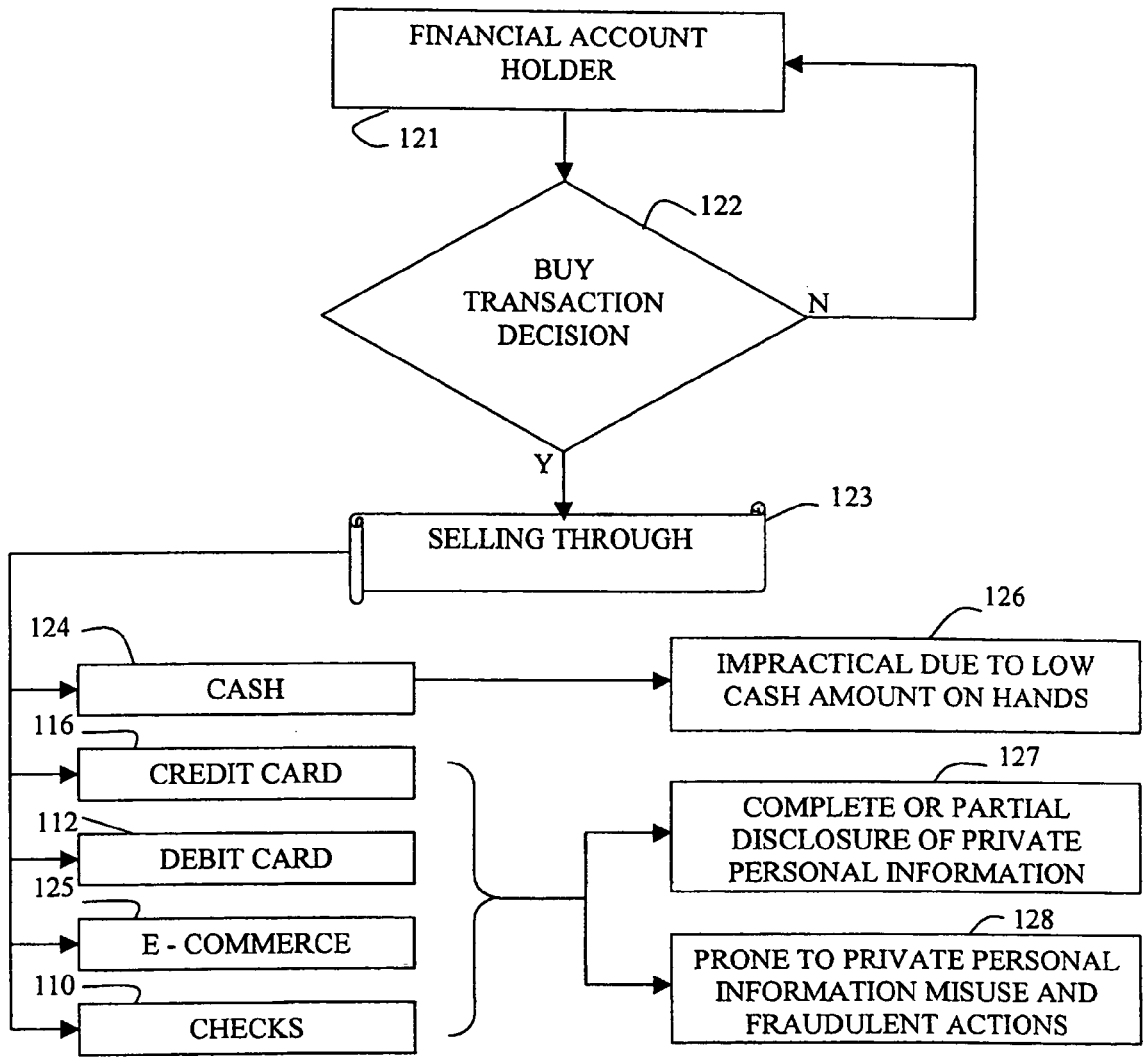
FIG. 1B is a block diagram of a conventional system for performing buy/sell transactions.
Figure 2:
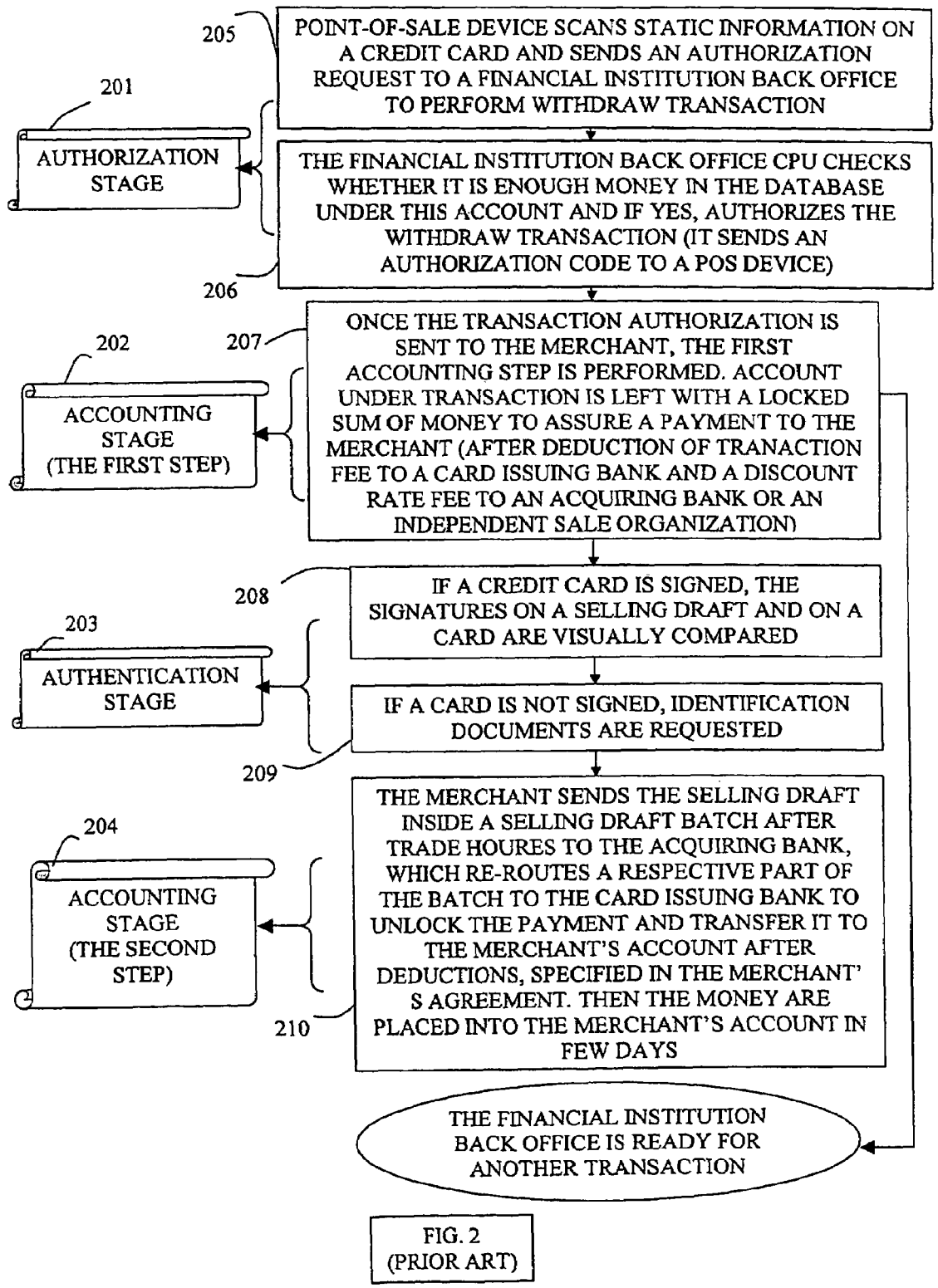
FIG. 2 is a block diagram of a conventional system and method for performing authentication, authorization and accounting sessions during buy/sell transactions with a credit card or a debit card.
Figure 3:
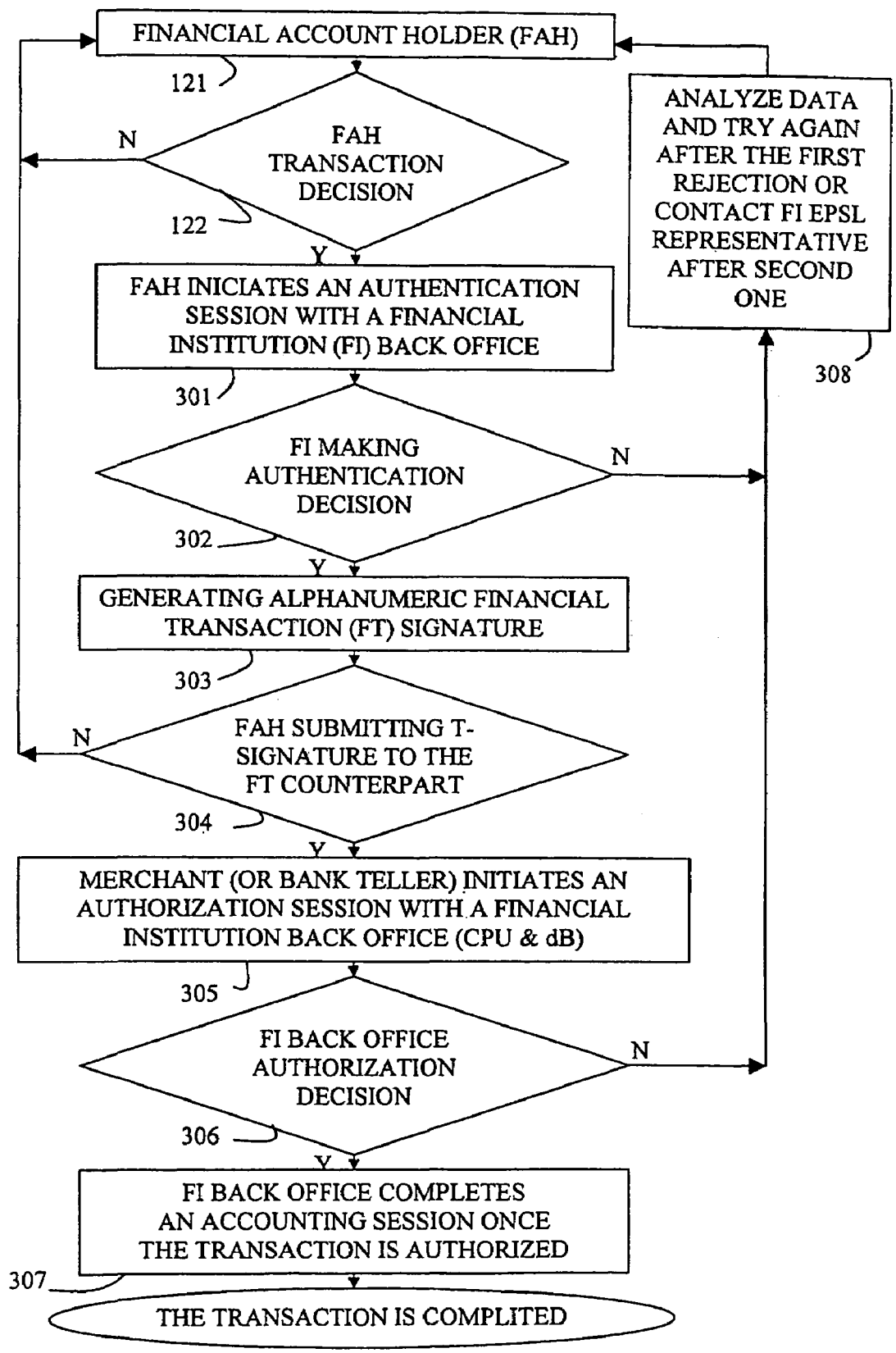
FIG. 3 is a flow diagram of the embedded privacy and security layer (EPSL) architecture for either buy/sell or withdraw/deposit transactions.

FIG. 3 shows a flow diagram of an embedded privacy and security layer EPSL architecture for buy/sell and withdraw/deposit transactions according to the present invention. Financial account holder 121 makes a transaction decision 122 irrespective whether it is going to be on or off line financial transaction and independent of the point of sale (or a bank teller) locations. It is assumed at this stage that the financial account holder knows an approximate or exact amount of money, which will be required to perform the predicted financial transaction. Following the transaction decision (step 122), at step 301, the financial account holder initiates an authentication session with a financial institution back office CPU and dB where financial account holder account resides. Details of how the authentication session is performed at financial institution back office according to present invention is described later. However, several features of step 301 are disclosed here.

The financial account holder has to go through three tiers of financial institution back office security protection, to initiate the authentication session. First two tiers are based on disclosing a financial institution EPSL account number and then a transaction (deposit or withdraw) static PIN secret number, which are intended to be known only to financial account holder and financial institution back office. Since the financial institution back office may be accessed by a financial account holder through various dedicated communication lines, which have non-guaranteed security protection, a third security protection tier is included. The third tier is based on an interactive dialog between the financial institution back office and the financial account holder. The back office prompts the account holder to enter a random subset of digits particular to the given communication session of an identity PIN secret number, which is known only to financial account holder and financial institution back office. The third security protection tier allows eliminating any potential information leaks at the entry devices and on the communication lines themselves. Whoever intercepts the random digit combination, requested during the third tier processing from financial account holder, will not be able either reuse it or reengineer the entire identity PIN.

Another feature of step 301 is that the financial institution back office prompts the financial account holder to enter the predicted transaction amount of money. Then, at the end of the authentication session 302, an alphanumeric transaction signature is generated at the financial institution back office 303 and transferred back to financial account holder. This signature is specific to a particular financial transaction amount requested by financial account holder, and has a limited life time, set by default to a reasonable time interval sufficient enough to perform the financial transaction. It should also be noted here that the alphanumeric signature can be used for only one financial transaction and can not be reused.

Once the financial account holder is authenticated for a particular financial transaction, there is still room to back off from the financial transaction. To execute the transaction, the financial account holder submits the alphanumeric transaction signature to a party at the point of sale (merchant or a bank teller) along with a financial institution EPSL account number. Neither the alphanumeric signature nor the financial institution EPSL account number contains any private personal information, which could be associated with the financial account holder requesting a party at the point of sale to continue a financial transaction. At step 305 a party at the point of sale initiates an authorization session with financial institution back office CPU and dB. In addition to the alphanumeric transaction signature and financial institution EPSL account number given by the financial account holder, the party at the point of sale adds a business ID and an actual transaction amount of money and then sends this time stamped information sequence for authorization at financial institution back office. The detailed system and method to perform an authorization session at financial institution back office will be discussed later. Information sent by the party at the point of sale (or a bank teller) for authorization is sufficient enough not only for an authorization session decision making process 306, but for accounting session completion as well 307. At this moment, the financial transaction is completed in a highly secure manner without disclosing financial account holder private personal information to a party at the point of sale.

The top level financial transaction architecture disclosed above is applicable to on and off line financial transactions. Though hardware and software environments at the point of sale locations (like POS devices, GUI, selection of communication lines etc.) may vary for each of those two cases, the fundamental architecture of private and secure financial transactions remains the same. The authentication stage, becomes the first performed step in the system and has paramount priority and security enforcement. It is not a party at the point of sale any more, who authenticates the financial account holder, but the financial institution back office. It prevents fraud, embarrassment and private personal information misuse by a party at the point of sale (or a bank teller). The financial account holder can not repudiate the financial transaction, as nobody else could transact it in his or her place. The authorization and accounting stages of the financial transaction in the revealed system architecture can not occur without a prior request by the financial account holder. Thus, authorization and accounting are coupled with the actual financial account holder, while authentication sessions became tightly coupled with the financial institution back office.

Figure 4:
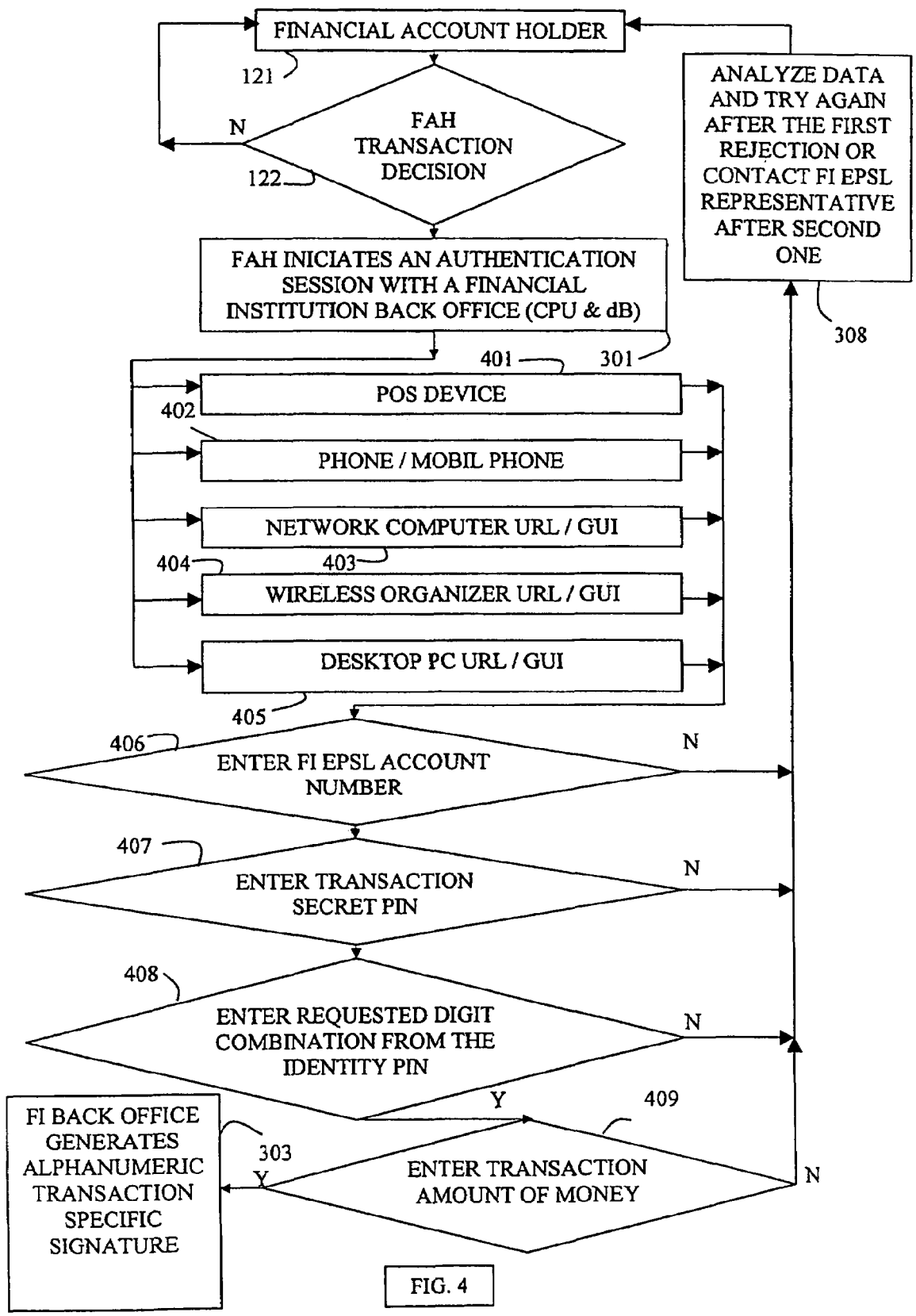
FIG. 4 is a flow diagram of the EPSL authentication session (while on financial account holder side).

FIG. 4 illustrates a flow diagram of the EPSL authentication session (from the financial account holder side). Basically, it is a more detailed flow diagram of steps 121-122-301-302-303 shown earlier in FIG. 3, which all together constitute the authentication session for the financial account holder with the financial institution back office. The financial account holder is expected to use various devices and communication lines to be able to reach financial institution back office. As illustrated in FIG. 4, example communication devices include point of sale POS devices 401, conventional phone lines and mobile phones 402, network computers with URL/GUI capabilities 404 and desktop personal computers connected to the Internet (or specialized financial institution on line services) 405. Once connection to the financial institution back office is established, the financial account holder is first requested to enter a financial institution EPSL account number 406 (the first security tier). Then the financial account holder is requested to enter a transaction type static PIN secret number 407 (the second security tier) and a requested random combination of digits from an identity PIN secret number 408 (the third security tier). Finally, the financial account holder enters an expected transaction amount of money 409. A failure in making any of steps 406-407-408-409 leads to refusal by the financial institution back office to perform the authentication session. It is expected that the financial account holder at this point will try again to initiate an authentication session or contact the financial institution EPSL representative after the second rejection 308. Successful completion of these steps ends up with an alphanumeric transaction specific signature generated at financial institution back office and transferred back to financial account holder 303. Step 409 is a last step in the authentication session, and it begins the accounting session at financial institution back office. In this step 409, the transaction amount of money requested by financial account holder is compared with an amount available in the account. The amount predicted should not be less than the actual amount specified later by a party at the point of sale (or a bank teller) during the authorization session request. It is important to note that step 303 will not be reached and the authentication stage at step 409 will be rejected, if the credit/debit financial institution EPSL card is listed at financial institution back office as lost, stolen or fraudulently used. The authentication stage at step 409 will also be rejected, if the transaction amount of money requested by financial account holder exceeds available ones at financial institution EPSL account.

Figure 5:
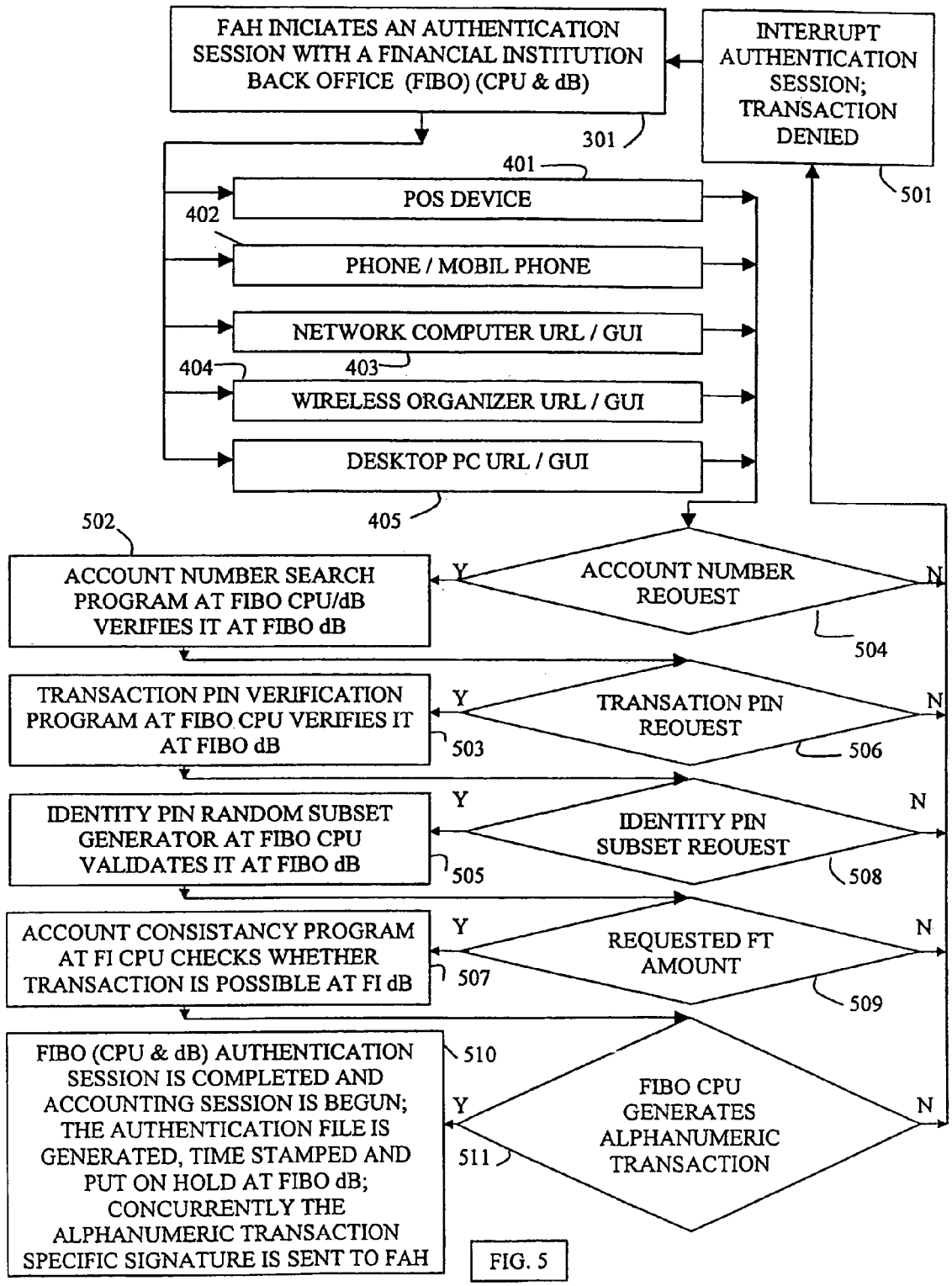
FIG. 5 is a flow diagram of the EPSL authentication session (while on financial institution back office CPU and dB side).

FIG. 5 shows a flow diagram of the EPSL authentication session (from the financial institution back office CPU and dB side). Due to a central position occupied by an authentication session in the disclosed financial transaction system architecture, it is necessary to show how financial institution back office system is adapted to handle the authentication session. A financial account holder initiates the authentication session with the financial institution back office 301 in the same way and through the same communication devices/channels as shown in FIG. 4. Although a detailed system and method of performing AAA at financial institution back office will be described later, certain features specific to the authentication-session features are discussed here.

At decision-making step 504, ACCOUNT NUMBER SEARCH PROGRAM module 502 is activated in the financial institution back office CPU/dB, which transitions the authentication session to next decision-making step 506, provided financial institution EPSL account number verification is successful. At step 506 TRANSACTION PIN VERIFICATION PROGRAM module 503 is activated and transitions the authentication session to decision-making step 508, provided transaction type PIN verification in the financial institution back office dB is successful. At step 508 IDENTITY PIN RANDOM SUBSET GENERATOR module 505 is activated at financial institution back office CPU and transitions the authentication session to decision-making step 509, provided a random subset of digits is validated at the financial institution back office dB. At step 509 ACCOUNT CONSISTENCY PROGRAM module 507 is activated at the financial institution back office CPU and transitions the authentication session to decision-making step 511, provided the transaction amount of money, specified by financial account holder during an authentication session does not exceed available finds in the account. At step 511 the authentication session is completed at the financial institution back office and the accounting session is begun 510, unless the financial institution EPSL card is in the list of lost, stolen or fraudulently used, which would lead to rejecting the entire authentication session. Otherwise, the authentication file will be generated, time stamped and put on hold at financial institution back office dB concurrently with the alphanumeric financial transaction specific signature, which is generated and sent to the financial account holder. One may note that a number of program modules 502, 503, 507 and 510 are incorporated into financial institution back office software environment to perform an authentication session. This is just a part of the automated "clocked" AAA sessions, which constitute the system and method at financial institution back office to enable financial institution EPSL technology.

Figure 6:
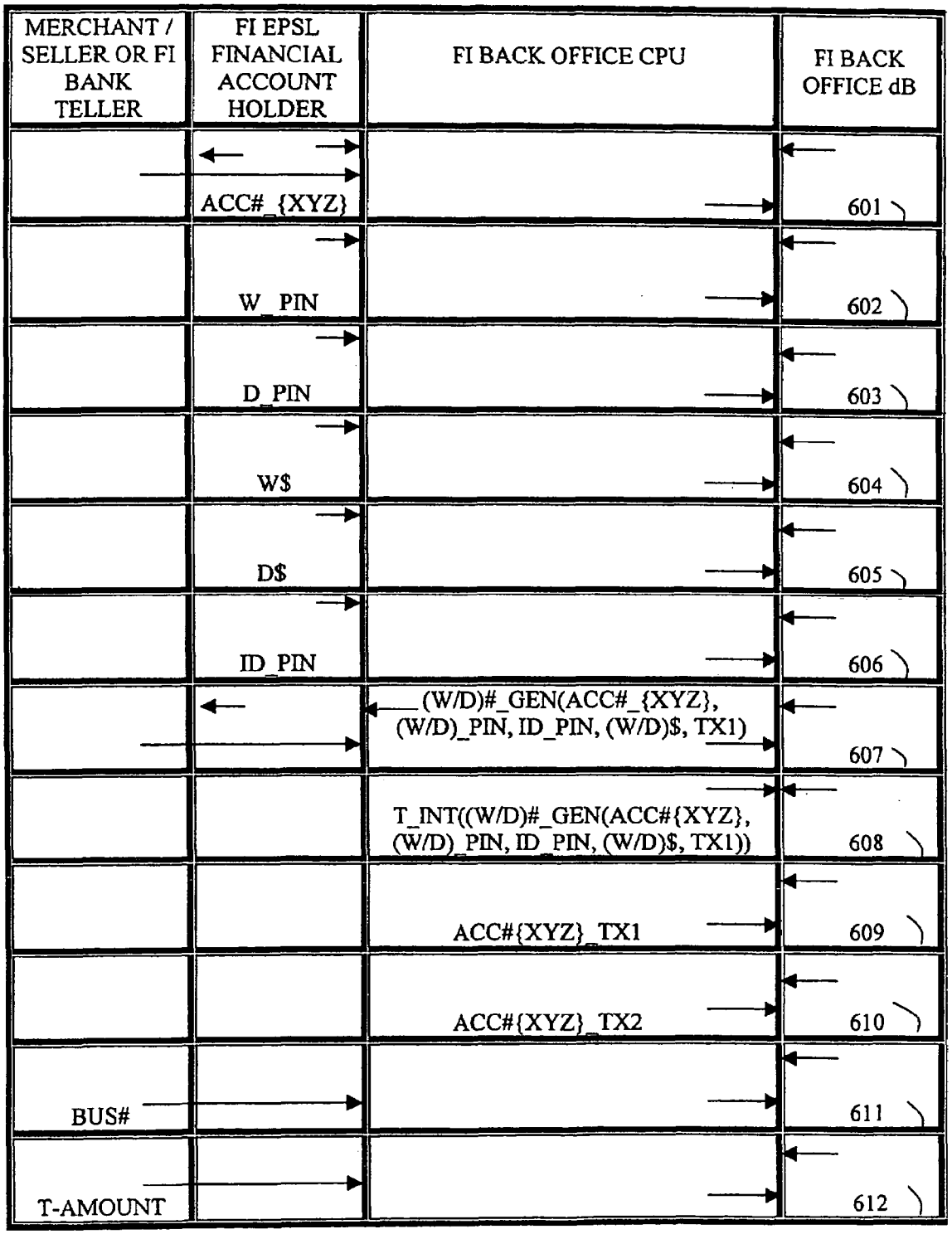
FIG. 6 is an interface protocol of the EPSL architecture.

FIG. 6 shows an interface protocol of the EPSL architecture. The columns correspond to nodes that process parameters. A parameter name in a cell shows where the parameter is originated. If an arrow onset begins from the cell, where a parameter is originated, an arrowhead shows where the parameter is delivered to for further processing. If an arrow onset cell location is different than the cell location in the same row at which the parameter originates, this arrow shows a destination cell to which a parameter was moved for processing in an earlier exchange, and from which it is moved again as indicated by the arrow.

Parameter ACC#_{XYZ} 601 is financial institution EPSL account number. "XYZ" should be broadly constructed to mean a certain number, which uniquely characterizes financial institution EPSL financial account holder. Parameter W_PIN 602 is a withdraw transaction PIN secret number. Parameter D_PIN 603 is a deposit transaction PIN secret number. Parameter W$ 604 is withdrawal transaction amount, specified by financial account holder during an authentication session. Parameter D$ 605 is a deposit transaction amount, specified by financial account holder during an authentication session. Parameter ID_PIN 606 is the identity PIN secret number, used by financial institution back office and financial account holder during an interactive part of an authentication session. Parameter (W/D)#_GEN (ACC#_{XYZ}, (W/D)_PIN, ID_PIN, (W/D)$, TX1) 607 is an alphanumeric signature, generated at the end of a successful authentication session. (W/D)#_GEN is a function of other parameters, listed above. The only unknown yet parameter is TX1, which is a time point at which an authentication session is successfully completed (see FIG. 9). Parameter T_INT((W/D)#_GEN(ACC#_{XYZ}, (W/D)_PIN, ID_PIN, (W/D)$, TX1)) 608 is a time interval, counted from the moment TX1. It specifies an alphanumeric signature lifetime for a specific financial transaction derived internally at financial institution back office at the end of a successful authentication session. Parameter ACC#_{XYZ}_TX1 609 is an authentication file name, defined at the end of a successful authentication session inside financial institution back office. Parameter ACC#_{XYZ}_TX2 610 is an authorization file name, defined at the beginning of a successful entry data transfer at the beginning of an authorization session inside financial institution back office. Parameter BUS#611 is a merchant/seller/vendor standard ID number specified by a party at the point of sale during an authorization session request. Parameter T-AMOUNT 612 is an exact amount of money, required to perform financial transaction and specified by a party at the point of sale (or a bank teller) during an authorization session request.

Figure 7:
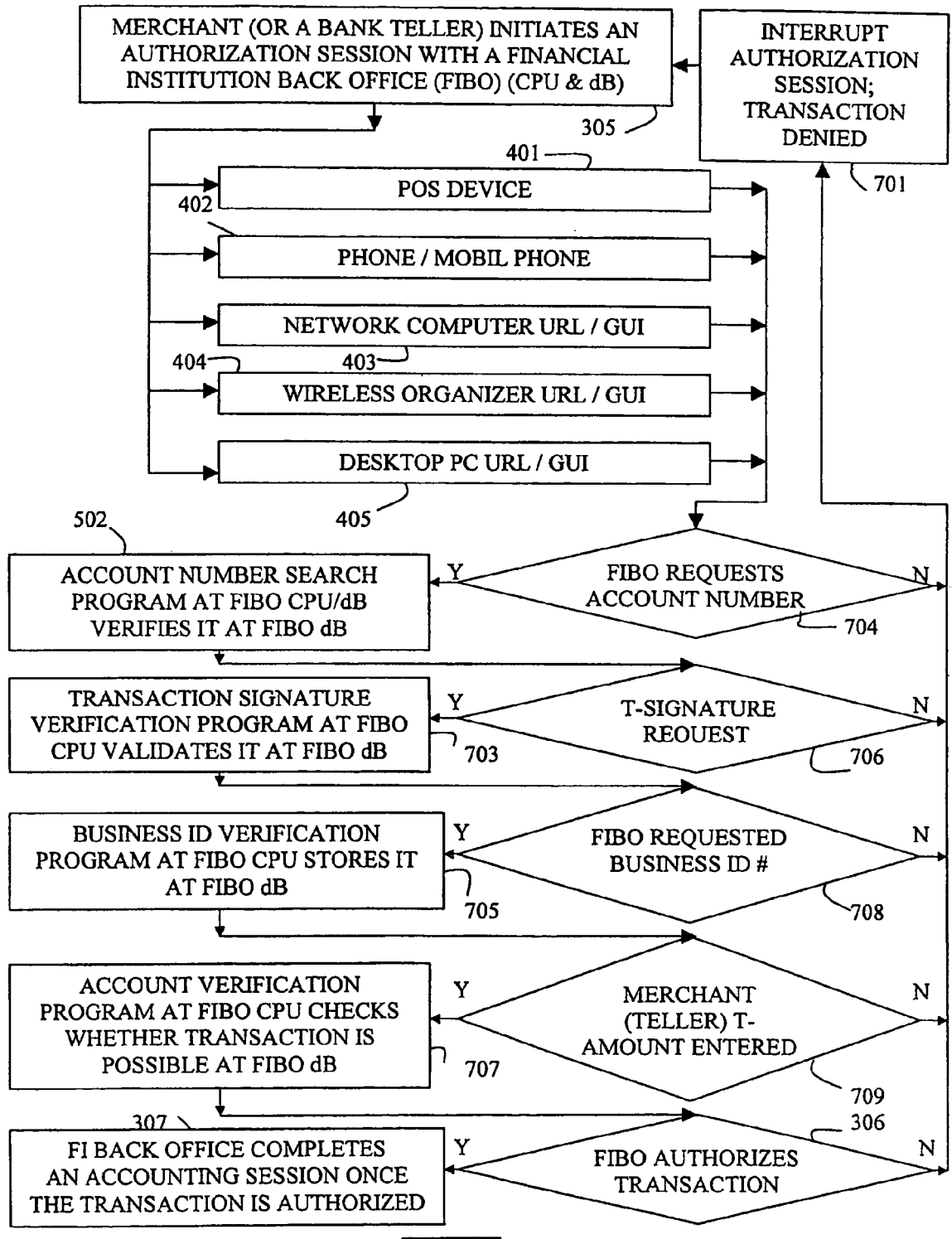
FIG. 7 is a flow diagram of the EPSL authorization session.

FIG. 7 shows a flow diagram of the EPSL authorization session. It corresponds to steps 305-306-307 in FIG. 3. All together they constitute the authorization session of financial transaction. A party at the point of sale can access the financial institution back office to initiate the authorization session using the same devices/communication lines 401-405 as financial account holder, when initiating the authentication session (see financial institution GS. 4-5). Though a detailed system and method of performing AAA at financial institution back office will be described later, certain specific to the authorization session features can be described here.

At decision-making step 704, ACCOUNT NUMBER SEARCH PROGRAM module 502 is activated at financial institution back office CPU/dB and transitions the authorization session to decision-making step 706, provided the account number is positively verified at the financial institution back office dB. Otherwise, the authorization session is denied. At decision-making step 706, TRANSACTION SIGNATURE VERIFICATION PROGRAM module 703 is activated at the financial institution back office CPU and transitions the authorization session to decision-making step 708, provided the alphanumeric transaction signature is validated at the financial institution back office dB. At decision-making step 708, BUSINESS ID VERIFICATION PROGRAM module 705 is activated at the financial institution back office CPU and transitions an authorization session to decision-making step 709, provided a party at the point of sale ID is on a list of valid, legal merchants. At decision-making step 709, ACCOUNT VERIFICATION PROGRAM module 707 is activated at the financial institution back office CPU and transitions the authorization session to decision-making step 306, provided the predicted transaction amount entered by financial account holder at the respective authentication session is more than or equal to the actual amount, entered by a party at the point of sale, while requesting the authorization session. At decision-making step 306, the financial institution back office completes authorization and accounting sessions, provided the credit/debit EPSL account card is not on a list of lost, stolen or fraudulently used cards. This checks again whether there are no suspicious issues related to this particular account since the authentication session was completed.

It can be noted here that a number of program modules 502, 703, 705, 707 and 307 are incorporated into financial institution back office software environment to perform an authorization session. As will be seen later, this is part of the automated "clocked" AAA sessions, which constitute the system and method implemented at the financial institution back office to enable financial institution EPSL technology.

FIG. 8 shows the EPSL transaction checklist. Pluses mean that a particular parameter in a respective row is used during one of AAA sessions, specified at the top of the columns. Minuses mean that parameters are not used.

Figure 9A:
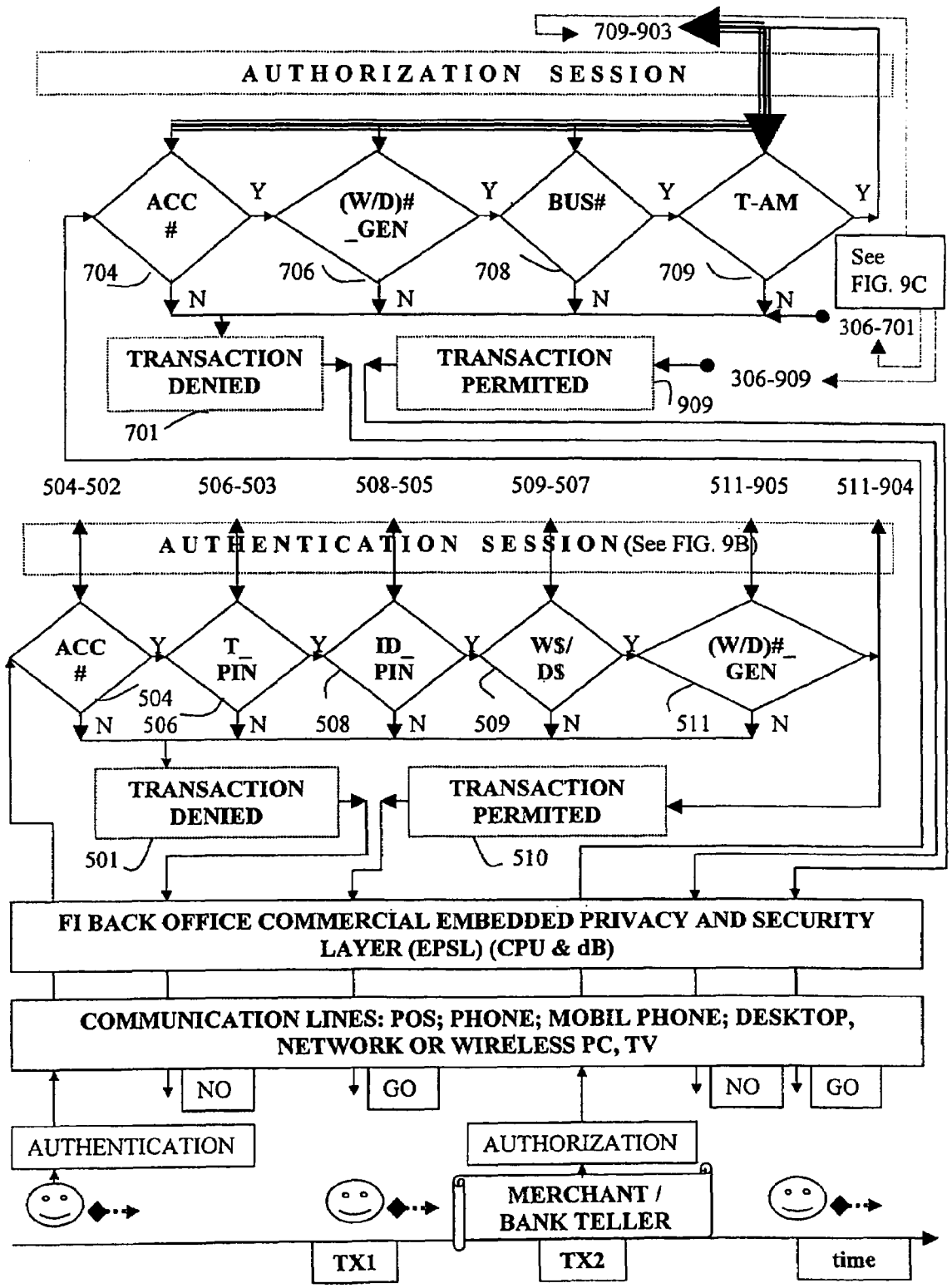
FIGS. 9A, 9B and 9C are a synthesis of a timing diagram, a flow chart and a functional diagram of the EPSL architecture based on the "clocked" AAA technology.
Figure 9B:
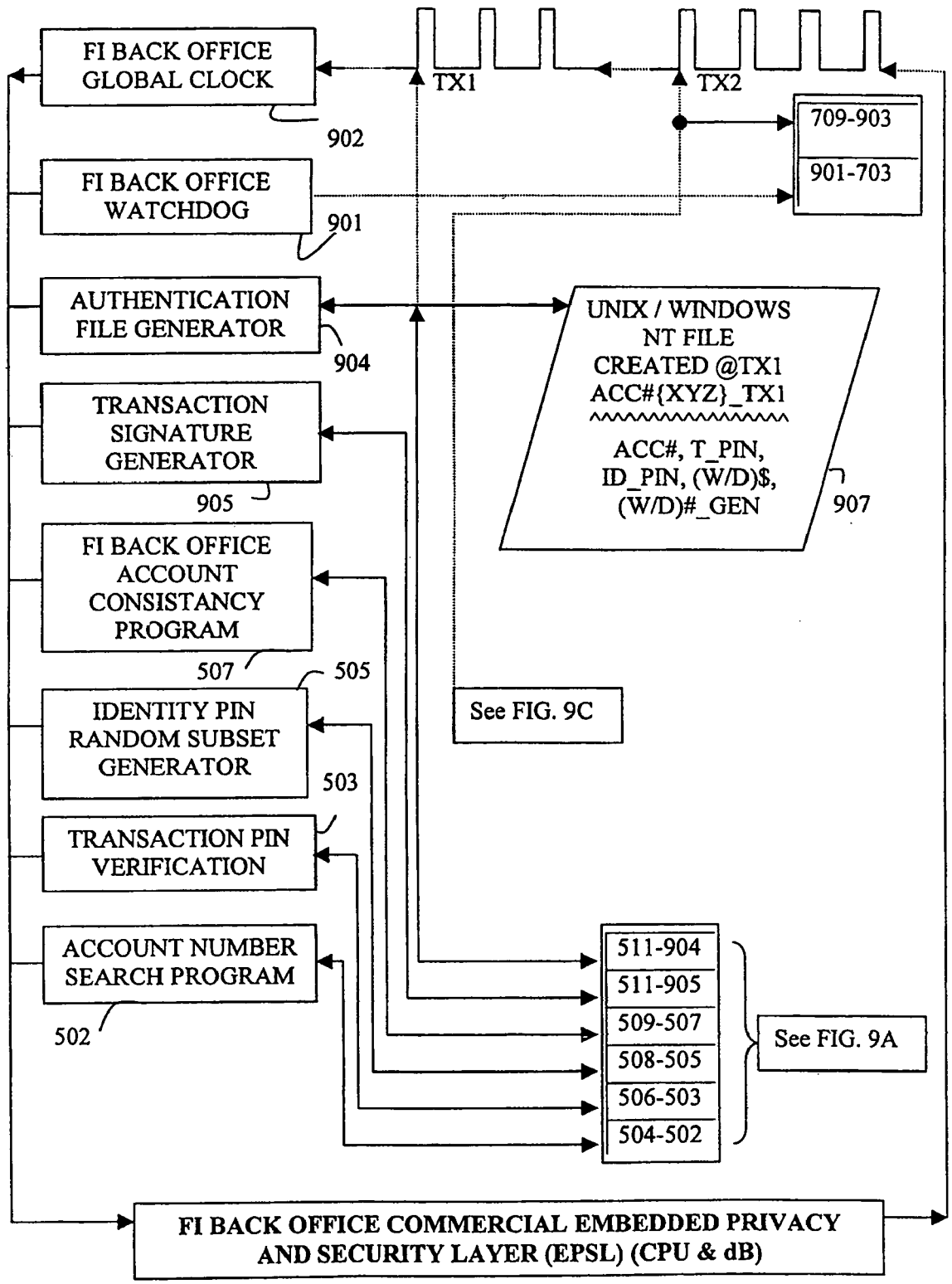
Figure 9C:
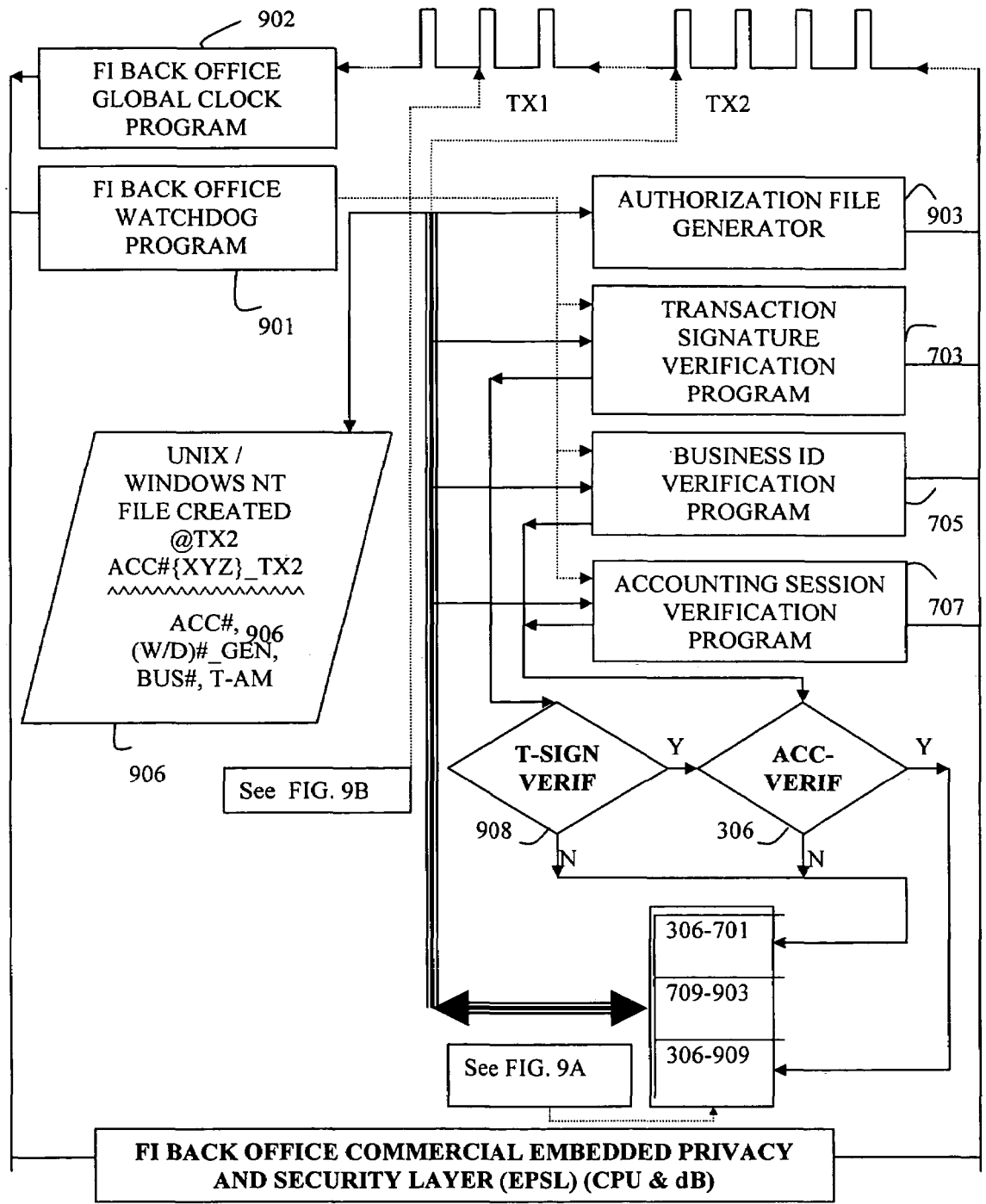

FIGS. 9A, 9B and 9C illustrate a synthesis of a timing diagram, a flow chart and a functional diagram of the EPSL architecture based on the "clocked" AAA technology. One may note that the part, related to the AUTHENTICATION SESSION (a dotted line of a non-numbered cell), is already presented in FIGS. 4-5, while the part named the AUTHORIZATION SESSION (also a dotted line of a non-numbered cell) is described in FIG. 7.

The financial institution back office has GLOBAL CLOCK PROGRAM module 902. A hardware equivalent is implemented as a silicon digital integrated circuit internal clock (with a typical rate approximately within the range (10-1,000) MHz). Module 902, which can be fed by similar clock at financial institution back office CPU, synchronizes all program modules during AAA sessions. Each financial transaction beginning from the start of the authentication session and up to the end of the authorization and accounting sessions is processed depending on their time position, defined by the global clock. The global clock synchronizes all program modules. Every program module is activated by one of the other program modules once its job is completed. Key information elements of financial transactions stored in financial institution back office dB (for instance, authentication and authorization files) are strictly analyzed and differentiated depending on their positions in time, which is a part of a decision making process at financial institution back office. The global clock program module enables financial transaction related timing components and parameters identification as well as the entire EPSL system of program modules and hardware synchronization at financial institution back office.

A financial account holder initiates the authentication session with the financial institution back office through any of described above devices/communication lines by entering a series of numbers (three tiers security protection system described above). Once the beginning of a communication session is established, module ACCOUNT NUMBER SEARCH PROGRAM 502 is activated, requesting the financial account holder to enter a financial institution EPSL account number. Once the financial account holder has entered ACC#_{XYZ} 601, if ACC#_{XYZ} is positively verified, module 502 activates module TRANSACTION PIN VERIFICATION PROGRAM 503 and stops its own execution. If ACC#_{XYZ} is not verified at the financial institution back office dB, the financial transaction authentication session is denied and module 502 stops execution without activating module 503. Decision-making routine ACC#504 is a part of module 502 and makes a decision whether to activate module 503 or not, based on ACC#_{XYZ} verification results at financial institution back office dB.

TRANSACTION PIN VERIFICATION PROGRAM module 503, once activated, requests the financial account holder to enter a transaction PIN and executes, once the W_PIN 602 or D_PIN 603 is entered. Decision-making routine T_PIN 506, which is a part of module 503, stops module 503 and activates IDENTITY PIN RANDOM SUBSET GENERATOR module 505, provided (W/D)_PIN is positively verified at the financial institution back office dB. Otherwise, routine T_PIN 506 stops module 505 and the financial transaction authentication session is denied.

Module 505 once activated, generates a request to the financial account holder to submit in sequence a certain random combination of digits that constitute a subset of a financial account holder identity PIN secret number ID_PIN 606 and then executes on analyzing a received reply, entered by financial account holder during this interactive session (the third tier of financial institution back office security protection). Decision-making routine ID_PIN 508, which is a part of module 505, stops module 505 and activates financial institution back office ACCOUNT CONSISTENCY PROGRAM module 507, provided the random subset of digits, entered by financial account holder per the request of module 505 is positively validated at financial institution back office dB. Otherwise, routine ID_PIN 508 stops module 505 execution without activating module 507 and the financial transaction authentication session is denied.

A financial institution back office ACCOUNT CONSISTENCY PROGRAM module 507, once activated, requests the financial account holder to enter a predicted withdraw transaction amount W$ 604 or predicted deposit transaction amount D$ 605 and executes, once (W/D)$ is entered. Decision-making routine 509, which is a part of module 507, stops module 507 and activates TRANSACTION SIGNATURE GENERATOR module 905, provided W$ does not exceed the amount of money available on this financial institution EPSL account. Otherwise, routine (W/D)$ 509 stops module 507 execution without activating module 905 and the financial transaction authentication session is denied.

TRANSACTION SIGNATURE GENERATOR module 905, once activated, generates an alphanumeric signature, provided all previous steps 504, 506, 508 and 509 are successful. Decision-making routine (W/D)#_GEN 511, which is a part of module 905, stops module 905 and activates module 904, provided the credit/debit financial institution EPSL account card is not on a list of lost, stolen or fraudulently used cards. Concurrently with activating module 904, routine 511 sends the alphanumeric transaction signature to the financial account holder 510.

AUTHENTIFICATION FILE GENERATOR module 904, once activated, creates an electronic record, which contains some or all of the information gathered together during the authentication session: ACC#_{XYZ}_601, (W/D)_PIN 602 or 603, ID_PIN 606, (W/D)$ 604 or 605 and (W/D)#_GEN 607. The record is given a file name is ACC#_{XYZ}_TX1 609, which is a combination of financial institution EPSL account number and a time mark TX1. TX1 is a time moment, at which file ACC#_{XYZ}_TX1 907 is generated in financial institution back office dB. Practically speaking, it is the same time as when the financial account holder obtains his alphanumeric signature for a requested financial transaction. The time mark TX1 is assigned at the end of the authentication session for the financial account holder and financial institution back office in this example. The authentication record with the file name ACC#_{XYZ}_TX1 can be created irrespective to which operating system is deployed at financial institution back office dB (for instance, UNIX/Solaris or Windows NT). Module 904 activates module 901 at the time moment TX1.

Financial institution back office WATCHDOG PROGRAM module 901, starting from the time moment TX1, searches financial institution back office dB after each small time interval (which can range for example, from several milliseconds to several seconds, depending on actual hardware/software implementation of financial institution back office CPU and dB). The search checks whether there is another record with the same root name ACC#_{XYZ} and suffix TX2 greater than TX1 (TX2>TX1). Module 901 can work in this mode of operation during time interval T_INT 608, which starts at TX1 and is set at financial institution back office to a reasonable time to perform a predicted financial transaction after the authentication session (for instance, a half an hour). Otherwise, it can be chosen by the financial account holder during the authentication session within certain range (for example, from a quarter of an hour to several hours). The record with file name ACC#_{XYZ}_TX2 906, which financial institution back office WATCHDOG PROGRAM module 901 is searching for, is created during the authorization session, requested by a party at the point of sale from the financial institution back office. The authentication session completed at the moment TX1 is followed by the authorization session, which has an intermediate stage of creating an authorization record at financial institution back office at some later time moment TX2 after TX1. The authorization file structure and its role in the "clocked" AAA technology will be discussed later along with the authorization session description.

The financial institution back office WATCHDOG PROGRAM module 901 stops searching for an authorization file 906 at the moment TX1+T_INT. Any authorization session, initiated by a party at the point of sale after that time will be denied with a message that the transaction signature is timed out. The financial account holder will need to initiate another authentication session for the same financial transaction to make it happen. Strictly speaking, module 901 will keep searching financial institution back office dB after the moment TX1+T_INT with gradually increased time interval between consecutive search sessions (for instance, double interval for TX1+T_NT<t<TX1+2*T_INT, triple interval for TX1+2*T_INT<t<TX1+3*T_INT, etc.). However, its function is changed. When the authorization file is found, module 901 will forbid financial transaction with the error message that financial transaction is timed out. At certain time moment (for instance, TX1+10*T_INT) module 901 completely stops searching for the authorization file ACC#_{XYZ}_TX2 906. Any authorization session initiated by a party at the point of sale for the same financial transaction will be simply denied from now on.

The reason module 901 search repetition time interval is getting gradually increased after the moment TX1+T_INT is to reduce the load on financial institution back office CPU. Limiting the lifetime of transaction signatures and making them specific to particular financial transactions allow eliminating any fraudulent actions based on decryption of these signatures. It greatly enhances security in using non-secure communication lines and line input/output devices. It is especially important for on line financial transaction and makes the EPSL technology a very suitable architecture for electronic commerce as well as for off line financial transactions.

The financial account holder applies to a party at the point of sale (or a bank teller) after obtaining the alphanumeric transaction signature at the end of the authentication session. A party at the point of sale (merchant or a bank teller) initiates an authorization session with the financial institution back office using the same devices/communication lines as possible during the authentication session (see financial institution GS. 4-5). A party at the point of sale gets from the financial account holder, a financial institution EPSL account number and a financial transaction alphanumeric signature. Then the party at the point of sale adds up a standard business identification (merchant) number BUS#611 and an actual transaction amount of money T-AMOUNT 612 necessary to perform financial transaction. Those are added to the authorization process for accounting processing at financial institution back office during the accounting session.

At decision-making step 704, ACCOUNT NUMBER SEARCH PROGRAM module 502 is activated, once a party at the point of sale sends the ACC#_{XYZ} 601 and it is received at financial institution back office. Then module 502 performs two steps, provided ACC#_{XYZ} 601 is a legitimate one (positively verified at the financial institution back office dB). Module 502 activates AUTHORIZATION FILE GENERATOR module 903 at the time moment TX2, which actually symbolizes the beginning of the authorization session at financial institution back office. Module 903 creates the authorization record with file name ACC#_{XYZ}_TX2 906 in the financial institution back office dB, and is kept active during the time when all authorization session entry information is passing through steps 706-708-709 and eventually gathered together in the authorization record ACC#_{XYZ}_TX2. In the second step, module 502 transitions the authorization session to decision-making step 706, provided again the account number 601 is positively verified at financial institution back office dB. Otherwise, the authorization session is denied through dedicated device 701 at financial institution back office, notifying a party at the point of sale with the error message of incorrect financial institution EPSL account number.

WATCH DOG PROGRAM module 901 activated at the moment TX1 keeps periodically searching financial institution back office dB. It is looking for the authorization record, which complements to the authentication record ACC#_{XYZ}_TX1 and, once the authorization record ACC#_{XYZ}_TX2 is created, module 901 eventually finds it. If the authorization record is created during time interval TX1<t<TX1+T_INT, the authorization session is continuing. Otherwise, it is denied. WATCHDOG PROGRAM module 901 right after the authorization file is found and positively identified with respect to time it is created, activates TRANSACTION SIGNATURE VERIFICATION PROGRAM module 703, ACCOUNTING SESSION VERIFICATION PRO- GRAM module 707 and BUSINESS ID VERIFICATION PROGRAM module 705. All these modules start processing information they are looking for in the authorization record or keep periodically looking at this record, until the expected information appears there after steps 706-708-709.

At decision-making step (W/D)#_GEN 706 the financial transaction alphanumeric signature is already transferred from a party at the point of sale to the financial institution back office and module 703 is activated (if it is not activated yet by module 901) and compares alphanumeric signatures in the authentication record and the authorization record. In a case they match, module 703 transitions the authorization session to decision-making step BUS#708. Otherwise, the authorization session is denied with the error message that the transaction signature is incorrect.

At decision-making step BUS#708, a party at the point of sale business ID BUS#611 is already transferred from a party at the point of sale to the financial institution back office and BUSINESS ID VERIFICATION PROGRAM module 705 is activated unless it was already activated by module 901. Module 705 checks whether a party at the point of sale BUS# is on the list of valid, legal merchants and then transitions the authorization session to decision-making step T-AM 709. Otherwise, the authorization session is denied with the error message that merchant ID is incorrect.

At decision-making step T-AM 709, a party at the point of sale specified exact transaction amount of money T-AMOUNT 612 transferred from a party at the point of sale to financial institution back office, is written to the authorization record 906 and ACCOUNTING SESSION VERIFICATION PROGRAM module 707 is activated, unless it was already activated by module 901. Module 707 reads out T-AMOUNT from the authorization record 906 and checks whether it is less or equal to the withdraw or deposit amount (W/D)$ specified in the authentication record 907. If T-AMOUNT is less or equal (=<) (W/D)$ (T-AMOUNT=< (W/D)$), module 707 locks T-AMOUNT at the financial account holder financial institution EPSL account to assure the payment to a party at the point of sale (after deductions of the transaction fee to the card issuing bank and the discount rate to the acquiring bank or an independent sales organization). This completes the accounting session, which is performed next after the authorization session.

If module 502 and 703 positively identifies a financial transaction after comparing authorization record 906 and authentication record 907 at decision-making step T-SIGN VERIF 908, the authorization session is transitioned to decision-making step 306. Otherwise, the authorization session is denied through dedicated device/channel 701 at financial institution back office.

At decision making step ACC-VERIF 306, the accounting session gets completed and the financial transaction is permitted, provided module 705 and 707 positively identified BUS#611 and T-AMOUNT 612 at financial institution back office dB. Otherwise, the financial transaction is denied. As can be seen, a successful completion of the accounting session is an essential part of the entire authorization process. The authorization code is sent to the financial account holder through dedicated device/channel 909 from the financial institution back office, provided the accounting session is successfully completed and the credit/debit financial institution EPSL account card is not on a list of lost, stolen or fraudulently used cards. This allows checking again whether there are no suspicious issues related to this particular account since the authentication session was completed. Authentication and authorization records are kept in financial institution back office dB for ongoing accounting control until they are archived.

Several notes about the described above "clocked" AAA technology at financial institution back office follow. First, how to perform chargeback using this technology is described. Chargeback is a credit card transaction that is billed back to a party at the point of sale, who made the sale. This occurs when financial account holder disputes a charge on their bill by claiming the product was never delivered or financial account holder was dissatisfied with it in some way. If a party at the point of sale and financial account holder agrees with the chargeback and its amount, the financial account holder requests financial institution back office to authenticate a deposit financial transaction using D_PIN secret number during the authentication session (instead of usually used W_PIN for buy/sell transactions). Then financial account holder submits to a party at the point of sale the alphanumeric signature along with the EPSL account number. In other words, chargeback is performed as a regular financial transaction with the only difference that the transaction signature generated at financial institution back office is for deposit financial transaction. Then a party at the point of sale requests financial institution back office to authorize this financial transaction in the same way as a withdraw financial transaction. Once the transaction is authorized at financial institution back office, a request to lock the chargeback amount is sent to the acquiring bank or an independent sales organization, where this merchant account is residing in order to guarantee the payment back to financial account holder. EPSL chargeback mechanism allows performing this financial transaction within standard EPSL architecture (referring back to FIG. 3) without disclosing to a party at the point of sale financial account holder private personal information.

The financial institution back office "clocked" AAA technology is adapted to service a party at the point of sale during authorization sessions requested by them independent of the entry data flow rate on particular devices and/or communication lines. In an extreme case, when a party at the point of sale enters ACC#_{XYZ}, (W/D)#_GEN, BUS# and T-AMOUNT manually, modules 703, 705 and 707 are activated by module 901, once module 502 verifies ACC#_{XYZ} and the authorization record ACC#_{XYZ}_TX2 906 is created in the financial institution back office dB. This file can be empty for a while, until the following parameters are entered. Until then each of the mentioned modules 703, 705 and 707 periodically looks at the authorization file, and picks up the parameter of interest as soon as it arrives at financial institution back office and is written into the authorization file. Alternatively, in the case that a party at the point of sale uses a specialized point-of-sale POS devices, which allow for high speed electronic data entry for the listed above parameters, modules 703, 705 and 707 will find needed parameters in the authorization file ACC#_{XYZ}_TX2 at the very first moment they were activated. In this case, modules 703, 705 and 707 could be activated by decision-making routines 706, 708 and 709 sooner than by module 901. That depends on specifics of hardware and software implementation of the "clocked" AAA technology at financial institution back office. Summarizing, it can be said that financial transaction authorization session processing time is not limited by financial institution back office "clocked" AAA technology, but rather by the entry data flow rate at a party at the point of sale locations.

Authentication sessions in EPSL "clocked" AAA technology are not time limited and can not be replaced by an automated electronic interaction between financial account holder devices (for instance, smart cards or mobile phones) and financial institution back office. It is because they include an interactive communication sessions between financial account holders and the financial institution back office, which constitutes the third security protection tier. This is sort of a trade off between financial institution EPSL technology security protection and inconvenience in using this technique. Fortunately, authentication sessions in the EPSL technology are performed prior to financial transaction, and the financial account holder can choose a time, when he/she is comfortable to get the transaction signature from financial institution back office. The way the financial account holder keeps the transaction signature after the authentication session is completed and before it is submitted to a party at the point of sale can vary. It can range from just writing it down into a notebook, to storing it electronically inside devices like smart cards, digital personal organizers with wireless connection capabilities and other electronic devices with read/write memory capabilities.

Smart card technology is an excellent complement to make EPSL technology more comfortable for the financial account holder and the third party at the point of sale. Smart cards can be used as intermediate information carriers between the financial institution back office, which will write financial transaction signatures into smart cards during authentication sessions, and the financial account holder. Then it can be read out from smart cards at the point of sale locations to speed up authorization session requests. This way there are no issues with smart card security protection, since they can not be reused. Even if a smart card is lost or stolen before the current financial transaction signature was deactivated during an expected financial transaction at the point of sale location, nobody knows, what was (W/D)$ amount requested and how close this transaction signature is to its lifetime end. Moreover, even the fact that the card may still carry a signature is not apparent. Therefore, chances are high that even in this case fraudulent actions will be unsuccessful. More than that, a smart card may not contain financial institution EPSL account number (it could be residing on EPSL membership cards). In this case, smart cards have absolute security protection against fraudulent actions at any time.

Mobil phones, network computers or other portable electronic devices having information read/write capabilities can be made as convenient as smart cards, functioning as intermediate authentication information carriers for one specific financial transaction (financial transaction alphanumeric signatures) between financial institution back office and a party at the point of sale.

The last note relates to utilizing financial institution EPSL architecture with "clocked" AAA technology at ATM stations. A financial account holder can perform an authentication session for a withdraw financial transaction either before or right during operations at ATM stations. In any event, once the authentication session with financial institution back office is completed, the financial account holder operates at ATM station as at the point of sale location, provided ATM stations hardware and software are altered to perform authorization requests in the EPSL architecture. This makes money withdraw sessions at ATM stations highly secured and protected against information to be looked after, stolen or fraudulently used, while preserving complete privacy of personal information.

Finally, it should be emphasized that the described innovation can be used on and off line, and for private and non-private sessions, in all cases for a highly secure financial transaction. If a financial account holder is not concerned with financial transaction privacy, the financial account holder name can be placed on the card and become one more parameter utilized in the "clocked" AAA technology. Meanwhile, use of EPSL financial transaction architecture and the "clocked" AAA technology for non-private financial transactions provides improved (essentially, "bullet prove") security of on and off line financial transaction. The entire EPSL architecture and the "clocked" AAA at financial institution back office for non-private financial transactions can be viewed as the fourth security tier, whereas in a case of private financial transactions, it is still the fourth security layer and the main embedded privacy layer as well.

A computer implemented method for managing financial transactions is described, comprising:

performing an authentication process for a predicted transaction by a particular account holder, the predicted transaction having a predicted transaction amount and a predicted transaction time, the authentication process producing a transaction signature for presentation upon execution of the predicted transaction;

performing an authorization process for a particular transaction having actual transaction amount and an actual transaction time upon presentation of the transaction signature, including verifying that the presented transaction signature matches the transaction signature for the predicted transaction, the actual transaction amount matches the predicted transaction amount and the actual transaction time matches the predicted transaction time; and performing an accounting process for the particular transaction as a result of a successful authorization process, including reconciling the predicted transaction amount and the actual transaction amount for the particular account holder.

In embodiments of such method, the authentication process includes:

establishing a communication session between the particular account holder and a financial transaction server;

at the server, accepting an account number and an identification number for the particular account holder;

at the server, accepting the predicted transaction amount;

at the server, producing the transaction signature and sending the transaction signature to the particular account holder; and entering identifying information for the predicted transaction in a memory at the server, wherein the authentication process includes prompting the particular account holder to supply a combination of digits from a personal identification code, wherein the combination does not include all of the personal identification code.

A financial transaction server is described, comprising:

a communication interface;

a data processing system coupled to the communication interface, the data processing system including resources for managing financial transactions, including an authentication process communicating over the communication interface for authenticating predicted transaction by a particular account holder, including routines which handle receiving a predicted transaction amount at an authentication time, producing a transaction signature for presentation upon execution of the predicted transaction, communicating the transaction signature to the particular account holder, and storing the transaction signature and parameters associated with the particular transaction;

an authorization process communicating over the communication interface for authorizing a particular transaction having actual transaction amount and an actual transaction time, including routines for handling receiving the transaction signature over the communication interface from a party to the particular transaction at an authorization time, verifying that the received transaction signature matches the transaction signature stored for the predicted transaction, that the actual transaction amount matches the predicted transaction amount and that the authorization time meets a time criterion; and an accounting process executed for the particular transaction as a result of a successful authorization process, including routines reconciling the predicted transaction amount and the actual transaction amount for the particular account holder.

In embodiments of such financial transaction server, the authentication process includes-routines:

establishing a private communication session between the particular account holder and a financial transaction server;

accepting an account number and an identification number for the particular account holder;

accepting the predicted transaction amount;

producing the transaction signature and sending the transaction signature to the particular account holder; and entering identifying information for the predicted transaction in a memory, wherein the authentication process includes a routine prompting the particular account holder to supply a combination of digits from a personal identification code, wherein the combination does not include all of the personal identification code.

A system and method for private and secure financial transactions. The system and method comprise embedded into financial institutions (financial institution) privacy and security layer architecture and the "clocked" authentication, authorization and accounting (AAA) method. The system and method enable legal financial account holders (financial account holder) to perform buy/sell or withdraw/deposit financial transactions (financial transaction) without disclosing private personal information to the transaction counterparts, while preserving highly elevated and enhanced security and fraud protection as compared with conventional methods. Before financial transaction, financial account holder initiates an authentication session with financial institution back office (financial institution back office) by accessing its central processing unit (CPU) and data base (dB), configured in the embedded privacy and security layer (EPSL) architecture with automated "clocked" AAA sessions by using dedicated communication lines. The authentication session is interactive, transaction specific and followed by either financial transaction deny or an alphanumeric signature generated for this specific financial transaction. Then financial account holder submits his/her request to a transaction counterpart along with the EPSL account number and the alphanumeric signature, generated by financial institution EPSL during previous authentication session. The transaction counterpart adds up additional or more refined financial transaction specific information and requests an authorization session with financial institution back office where the EPSL account, CPU and dB are residing. The accounting session starts at the end of the authentication session and finishes along with the authorization session while being an essential part of them both. The system and method are particularly suited for use by banks, credit card companies and brokerage companies. Finally, the system and method are well adapted to the current and upcoming software, hardware, and electronic commerce technologies and can be easily implemented given an acceptable business trade off.

Though the invention has been described in connection with preferred embodiments of the system and method for private and secure transactions, it is understood that the preferred embodiments have been used for the purpose of illustrating the manner in which the invention may be made and used. It should also be understood that implementation of other variations and modifications of the invention and its various aspects will be apparent to those skilled in the art, and that invention is not limited to these preferred embodiments described above. It is therefore contemplated to cover by present invention any and all modifications, variations, or equivalents that fall within true spirit and scope of the basic underlying principles disclosed hereinafter by the claims.

I claim:

1. An interactive method for authentication of a client, comprising:

storing a client identifier for a client and an identification code for the client in a computer database, the identification code comprising a set of password or Personal Identification Number (PIN) characters with each consecutive character position number in the set associated with a particular character;

supplying to the client, using a process executed by a computer system, a prompt for entry of a client identifier;

accepting in the computer system data from the client, the data indicating the client identifier for the client, and verifying that the data indicating the client identifier matches the stored client identifier;

supplying to the client, using a process executed by the computer system, a session random subset of character position numbers from said identification code for the client particular to a session, wherein the random subset of character position numbers does not include all of the character position numbers from the identification code;

accepting input data in the computer system from the client, the input data including a random subset of characters from the identification code, wherein the random subset of characters does not include all of the identification code; and determining in the computer system, whether the input data match characters from the stored identification code in a session random subset of character positions.

2. The method of claim 1, including using a random subset generator in the computer system to generate a random subset of character position numbers in the identification code, wherein the random subset comprises the session random subset of character position numbers.

3. The method of claim 1, including generating said session random subset of character position numbers after initiation of an authentication session in which it is used.

4. The method of claim 1, wherein said characters in the identification code comprise digits.

5. A transaction server, comprising:

a computer database storing a client identifier for a client and an identification code for the client, the identification code comprising a set of password or PiN characters with each consecutive character position number in the set associated with a particular character;

a computer system coupled to the computer database, the computer system including a module to supply to the client, a prompt for entry of a client identifier;

a module to accept data indicating the client identifier from the client via a data communication medium;

a module to verify that the data indicating the client identifier matches the stored client identifier for the client;

a module to supply to the client a session random subset of character position numbers from said identification code for the client particular to a session, wherein the random subset of character position numbers does not include all of the character position numbers from the identification code;

a module to accept input data from the client, the input data including a random subset of characters from the identification code for the client, wherein the random subset of characters does not include all of the identification code; and a module to allow processing of a transaction to continue if the input data matches characters from the stored identification code for the client in the session random subset of character positions, and to interrupt the given session if the input data does not match.

6. The transaction server of claim 5, including a random subset generator in the computer system to generate a random subset of position numbers in the identification code, wherein the random subset comprises said session random subset of character position numbers.

7. The transaction server of claim 5, wherein said session random subset of character position numbers is generated after initiation of an authentication session in which it is used.

8. The transaction server of claim 5, wherein said characters in the identification code comprise digits.

* * * * *